US011646790B2

(12) United States Patent
Morichetti et al.

(10) Patent No.: US 11,646,790 B2
(45) Date of Patent: May 9, 2023

(54) OPTICAL SYSTEM COMPRISING A RECONFIGURABLE DEVICE AND OPTICAL SYSTEM CONTROL METHOD

(71) Applicant: Politecnico Di Milano, Milan (IT)

(72) Inventors: Francesco Morichetti, Novara (IT); Andrea Ivano Melloni, Milan (IT); Douglas Oliveira Morais de Aguiar, Milan (IT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 17/775,408

(22) PCT Filed: Nov. 4, 2020

(86) PCT No.: PCT/IB2020/060372
§ 371 (c)(1),
(2) Date: May 9, 2022

(87) PCT Pub. No.: WO2021/090205
PCT Pub. Date: May 14, 2021

(65) Prior Publication Data

US 2022/0385358 A1 Dec. 1, 2022

(30) Foreign Application Priority Data

Nov. 7, 2019 (IT) ........................ 102019000020554

(51) Int. Cl.
*H04B 10/077* (2013.01)
*H04B 10/2507* (2013.01)
*H04J 14/02* (2006.01)

(52) U.S. Cl.
CPC ... *H04B 10/0773* (2013.01); *H04B 10/25073* (2013.01); *H04J 14/0227* (2013.01); *H04J 14/021* (2013.01)

(58) Field of Classification Search
None
See application file for complete search history.

(56) References Cited

U.S. PATENT DOCUMENTS 6,208,780 B1 3/2001 Li et al.
6,892,021 B2 5/2005 Doerr
(Continued)

FOREIGN PATENT DOCUMENTS

WO 2006128254 A1 12/2006

OTHER PUBLICATIONS

International Search Report; International Searching Authority; International Application No. PCT/IB2020/060372; dated Feb. 22, 2021; 5 pages.

(Continued)

*Primary Examiner* — Jai M Lee
(74) *Attorney, Agent, or Firm* — Taft Stettinius & Hollister LLP

(57) ABSTRACT

An optical system (100) is described including: a reconfigurable optical device (103) with multiplexing wavelength division, comprising a plurality of actuators (A1-AN) and having associated a number of optical channels (M) and a number of degrees of freedom (N) lower than the number of optical channels; an optical stimulus source (106) connected to said reconfigurable optical device (103) to provide an optical stimulation signal ($S_{in}$) having a wavelength band including a plurality of wavelengths associated with the optical channels; an optical-electric conversion device (200) configured to receive from said reconfigurable optical device (103) an optical monitoring signal ($S_{out}$) corresponding to the optical stimulation signal ($S_{in}$) and to provide a group of electrical signals of intensity ($S_{EL1}$-$S_{ELK}$) each representative of an intensity of the optical monitoring signal ($S_{out}$) evaluated at a relative wavelength included in said band. The (Continued)

system also includes a control device (110) configured to control the plurality of actuators (A1-AN) according to said group of electrical signals ($S_{EL1}$-$S_{ELK}$) and according to a control law.

16 Claims, 7 Drawing Sheets

(56) References Cited

U.S. PATENT DOCUMENTS

| | | | | |
|---|---|---|---|---|
| 9,577,763 | B2 * | 2/2017 | Al Sayeed | H04B 10/564 |
| 9,985,726 | B1 * | 5/2018 | Al Sayeed | H04B 10/0791 |
| 9,986,317 | B1 * | 5/2018 | Al Sayeed | H04J 14/0212 |
| 10,050,738 | B1 * | 8/2018 | Akasaka | H04J 14/0212 |
| 10,536,235 | B2 * | 1/2020 | Al Sayeed | H04B 10/03 |
| 2003/0053175 | A1 | 3/2003 | Szczepanek et al. | |
| 2017/0134089 | A1 * | 5/2017 | Mansouri Rad | H04J 14/0271 |

OTHER PUBLICATIONS

Written Opinion of the International Searching Authority; International Searching Authority; International Application No. PCT/IB2020/060372; dated Feb. 22, 2021; 8 pages.

* cited by examiner

OPTICAL SYSTEM COMPRISING A RECONFIGURABLE DEVICE AND OPTICAL SYSTEM CONTROL METHOD

CROSS-REFERENCE TO RELATED APPLICATIONS

This application is a U.S. National Phase of International PCT Application No. PCT/IB2020/060372 filed on Nov. 4, 2020, which claims priority to Italian Patent Application No. 102019000020554 filed Nov. 7, 2019, each of which are incorporated herein by reference in their entirety.

TECHNICAL FIELD

This invention refers to a method of controlling reconfigurable optical devices that can be used, for example, but not limited to, in the telecommunications sector in reconfigurable optical networks.

STATE OF THE ART

An example of a reconfigurable optical device is described in U.S. Pat. No. 6,892,021. This document describes an optical gain equaliser filter with a Waveguide Grating Router equipped with Mach-Zehnder adjustable optical attenuators, each associated with a relative wavelength of the optical channels used.

Moreover, document Schiffer, P. M. J., et al. "Smart dynamic wavelength equalizer with on-chip spectrum analyzer, IEEE Photonics Technology Letters 12.8 (2000): 1019-1021, describes a dynamic wavelength equalizer using two WGRs and using feedback control via a spectrum analyzer.

In addition, document Schlipf, T. R., et al. "Design and analysis of a control system for an optical delay-line circuit used as reconfigurable gain equalizer". Journal of lightwave technology 21.9 (2003): 1944, describes an open loop control system for a reconfigurable gain equalizer formed by a two-port lattice-form optical delay-line circuit.

SUMMARY OF THE INVENTION

The Applicant has noted that the closed loop control techniques of the known art are too complex, both in computational terms and in relation to the structure of the control circuit.

The present invention addresses the problem of providing an optical system that shows control techniques of a reconfigurable device of the system itself that are not particularly onerous computationally and complex from a structural point of view.

According to a first aspect, an object of the present invention is an optical system as described by claim 1 and its preferred embodiments as defined by claims 2-15.

Another object of the present invention is also the method of controlling an optical system as defined by claim 16.

BRIEF DESCRIPTION OF THE DRAWINGS

This invention is described in detail below, by way of example and without limitation, with reference to the attached drawings.

DETAILED DESCRIPTION

In this description, similar or identical elements or components will be shown in the figures with the same identifying symbol.

Figure 1:
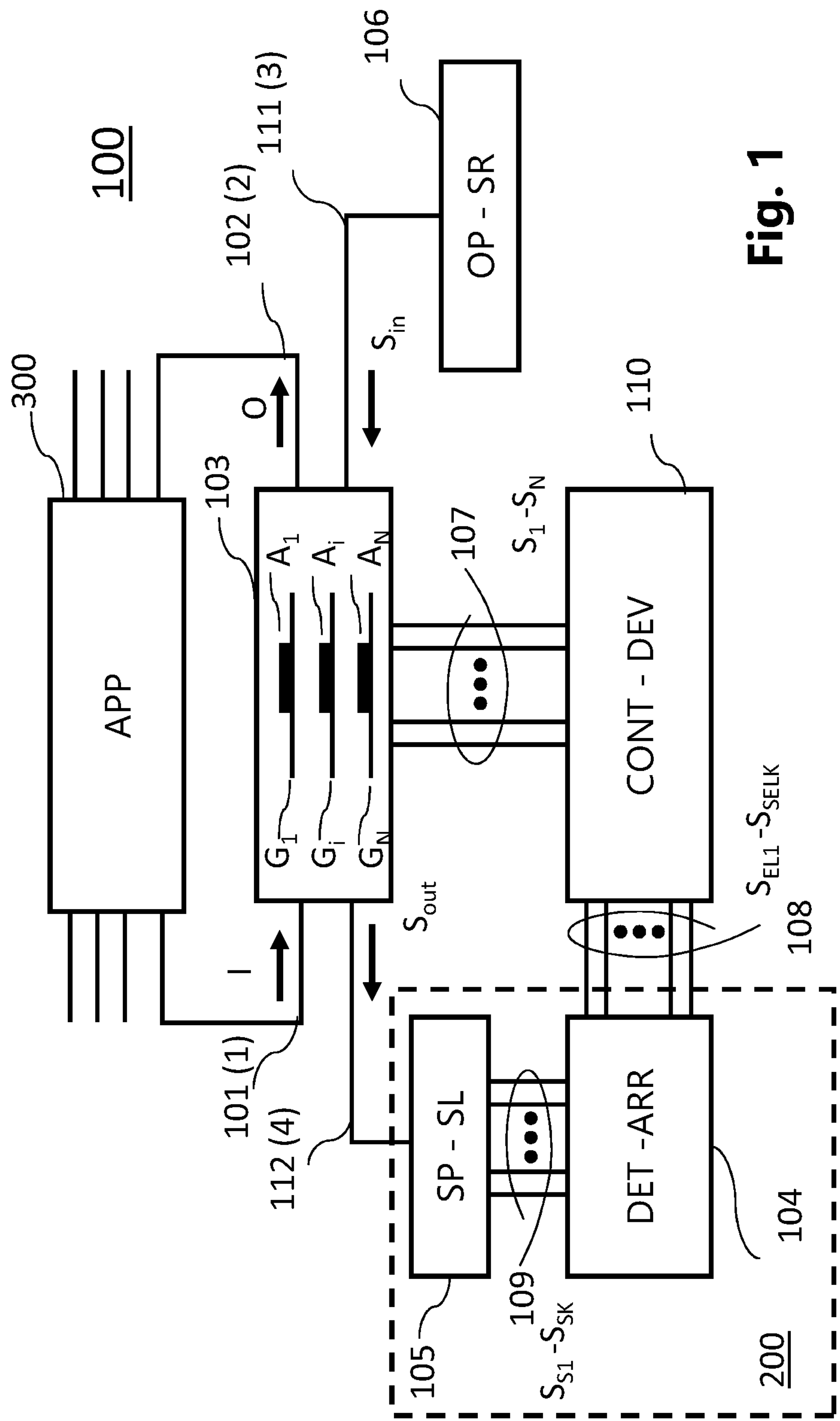
FIG. 1 shows a first embodiment of an optical system including a reconfigurable optical device and a control device.

FIG. 1 shows schematically a first embodiment of an optical system 100 including: a reconfigurable optical device 103, a control device 110 (CONT-DEV), an optical source 106 (OP-SR) and an optical-electric conversion device 200.

In particular, optical system 100 is such as to operate with electromagnetic radiation at wavelengths between 300 nm and 5000 nm, preferably between 1480 nm and 1620 nm.

For example, optical system 100 is a system that operates in the field of optical telecommunications and, in particular, in reconfigurable optical networks.

The reconfigurable optical device 103 (shorter, reconfigurable device) is such that it operates according to the WDM (Wevelength Division Multiplexing) technique on a plurality of M optical channels (at least two optical channels) i.e. with M optical signals with carriers at different wavelengths.

In particular, the reconfigurable device 103 includes at least one adjustable optical element Gi (such as, for example, an optical delay line, an adjustable optical coupler or an adjustable attenuator) configured to operate in WDM. As an example, a single adjustable optical element Gi with M channels or multiple adjustable optical elements Gi operating on M channels can be used.

The reconfigurable device 103 is also equipped with a plurality of N actuators $A_1$-$A_N$, associated with the adjustable optical elements Gi and such as to modify the optical characteristics (for example, the refractive index and/or the attenuation of the medium from which the adjustable device 103 is made) according to the corresponding $S_1$-SN control signals supplied by the control device 110. The reconfigurable device 103 can assume a discrete number of states depending on the value of its N state variables θ1, . . . , $\theta_N$ which are controlled by the N control signals $S_1$-SN.

Note that the N number of $A_1$-$A_N$ actuators defines the number of degrees of freedom of the reconfigurable device 103, i.e. the number of independent variables needed to fully determine the state of the reconfigurable device 103 itself.

Advantageously, the number of degrees of freedom N of the reconfigurable device 103 is lower than the number of channels M on which the reconfigurable device itself operates.

The actuators $A_1$-$A_N$ can be such as to induce a change in the optical parameters (e.g. phase or amplitude) of the relevant adjustable optical elements Gi. For example, the following devices can be used as actuators $A_1$-$A_N$: thermo-optical, electro-optical, piezoelectric, electro-absorbent, electro-mechanical, electrochemical or fully optical actuators (based or not on non-linear optical effects).

With regard to the exemplyfying sector of reconfigurable optical networks, the reconfigurable device 103 can be, for example: an optical filter, an equalizer filter, a dispersion compensator filter, a FIR filter, an IIR filter, a lattice filter, a binary tree filter.

For example, the reconfigurable 103 device can be made using integrated waveguide technology on an optical platform (or optical chip). Some examples of optical platforms that can be used include: semiconductor platforms (e.g.

silicon, indium phosphide, gallium arsenide), amorphous glasses (silicon dioxide, silicon nitride, silicon oxyfuride, silicon oxycarbon, silicon carbide), polymers and crystals (lithium niobate), possibly integrated with two-dimensional materials (graphene, silicene), and possible hybrid integrations of the same.

According to the example in FIG. 1, the reconfigurable optical device 103 is a device with at least four optical ports. More in detail, the reconfigurable optical device 103 includes an optical input port 101 and an optical output port 102. The optical input optical port 101 is configured to receive the plurality of M optical input signals, multiplied into an input signal I, and the optical output optical port 102 is configured to transmit an optical output signal O in particular, M optical output signals multiplied, as resulting from the action of the reconfigurable optical device 103.

In addition, the reconfigurable optical device 103 is equipped with an optical stimulation port 111, connected to the optical source 106, and an optical monitoring port 112, connected to the optical-electric conversion device 200.

The plurality of the M optical input signals in the input signal I occupies an overall band $\Delta\lambda$, which identifies the working wavelength range for the reconfigurable device 103.

In particular, referring to applications in linear mode, in each of the states identified by state variables $\theta 1, \ldots, \theta_N$ the reconfigurable device 103 behaves, in each of the states it can assume, as a time-invariant linear system.

The transmission of the input signal I from the optical input port 101 to the optical output port 102 can be described through the frequency response $H_{12,i}(f)$ of the reconfigurable device 103 or equivalently by the wavelength response $H_{12,i}(\lambda)$, where the subscript "i" indicates the generic state assumed by the device itself.

Optical source 106 is configured to generate an optical $S_{in}$ stimulation signal which is supplied to stimulation port 111. Optical source 106 is configured to emit optical radiation over a wavelength range greater than or equal to the operating wavelength $\Delta\lambda$ range of the reconfigurable device 103. Optical monitoring port 112 is configured to provide an optical monitoring signal $S_{out}$ as the output corresponding to the optical stimulation signal $S_{in}$.

In the case of integrated optical devices, the optical source 106 can be integrated on the same optical platform (i.e., an optical chip) as the reconfigurable device 103 or can be external to that platform and connected to the reconfigurable device 103 via an optical fibre.

Preferably the optical source 106 includes a superluminescent diode (SLD), but other broadband sources can be used, such as, for example, the "amplified spontaneous emission" noise (ASE noise) of a fibre amplifier (e.g. erbium doped fibre amplifier, EDFA) or a semiconductor optical semiconductor amplifier (SOA), from a "supercontinuum laser" type source, from a laser array (e.g., distributed laser feedback, DFB), a comb spectral array (comb) generated by a fibre comb generator or integrated on an optical chip.

The optical-to-electrical conversion device 200 is configured to receive the monitoring optical signal $S_{out}$ and provide (for example, on electrical terminals 108) a set of electrical intensity signals $S_{EL1}$-$S_{ELN}$, each representative of an intensity of the monitoring signal $S_{out}$ evaluated at a relative wavelength. Note that the set of intensity electrical signals $S_{EL1}$-$S_{ELK}$ has a cardinality equal to K. Preferably, this cardinality K is equal to N, i.e. the group of intensity electrical signals $S_{EL1}$-$S_{ELK}$ has a cardinality equal to the number of degrees of freedom of the reconfigurable device 103.

According to the particular example shown again in FIG. 1, the optical-electric conversion device 200 includes a spectral range selector 105 (SP-SL), hereinafter also spectral slicer, and an optical-electric converter 104 (DET-ARR). The spectral slicer 105 is equipped with a corresponding optical input port connected to the optical monitoring port 112 so as to receive the $S_{out}$ monitoring signal and a plurality of optical output ports 109 (a number K optical ports 109, where preferably K=N number of degrees of freedom).

The spectral slicer 105 is configured to transmit to its generic k-th output port a selected $S_{outk}$ optical signal, corresponding to a portion of the monitoring signal $S_{out}$ centred around a k-th wavelength $\lambda_k$.

The spectral slicer 105, used to select the K wavelengths k to be monitored can be realized according to different technological and architectural solutions. For example, the spectral slicer 105 is a passive device that, i.e., does not need an external active control to select the $\lambda_k$ wavelengths.

Possible architectures that can be used for the spectral slicer 105 include Array Waveguide Gratings" (AWG), echelle gratings and other types of interferometric filters such as Mach Zehnder interferometers, Bragg gratings, ring resonators and any combinations thereof.

The spectral slicer 105 is preferably made in waveguide and is, for example, integrated on the same optical platform as the reconfigurable optical device 103. The spectral slicer 105 can also be realised with alternative technologies, using for example discrete optical components in free space, optical fibre components and combinations of the same.

According to this example, the 104 optical-electric converter comprises a plurality of photo detectors configured to convert the K sampled optical signals $S_{out}(\lambda_k)$ into the K intensity electrical signals $S_{EL1}$-$S_{ELK}$. The control device 110 is configured to control the plurality of actuators $A_1$-$A_N$ according to said set of intensity electrical signals $S_{EL1}$-$S_{ELK}$, generating the N control signals $S_1$-$S_N$, according to a pre-established control law.

With regard to the control law, for reconfigurability purposes, control device 110 operates so that the i-th state assumed by the reconfigurable device 103, in operating conditions, is as close as possible to an i-th "desired" state. For example, control device 110 is such as to define the plurality of control signals $S_1$-$S_N$ using the method of minimising the mean square error between an actual transfer function of reconfigurable device 103 and a desired transfer function of reconfigurable device 103.

The control device 110 can be realised, as an example, by means of a microcontroller, a CPU (Central Processing Unit), an FPGA (Field Programmable Gate Array) or a DSP (Digital Signal Processor), programmed according to the control methodology described below.

Note that the optical system 100 can also include an optical apparatus 300 (APP) operationally associated with the reconfigurable optical device 103. For example, the optical apparatus 300 can be an optical amplifier (in particular, of the doped fibre type) that allows the long distance transmission of optical signals without optoelectronic conversion and regeneration. Optical amplifiers commonly operate on a large number of optical signals, for example, on more than one hundred signals.

According to this example, the reconfigurable optical device 103 can be an equalizer filter configured to equalize the gain band of the erbium doped fibres of the optical amplifier 300 that do not have a constant gain over the entire frequency range occupied by the signals.

The use of the reconfigurable equalizer filter 103 allows adapting the optical amplifier 300 to the needs of a reconfigurable optical network. For example, for the erbium doped fibre optical amplifier 300, the reconfigurable equaliser filter 103 can have a number of degrees of freedom N=20 and operate on a number of optical channels M=100.

In the following, an example of a control method that can be used by the optical system 100 to reconfigure the reconfigurable device 103 will be described.

Referring to the wavelength domain, the optical output signal O (λ) supplied to optical output port 102 is given by the following expression:

$$O(\lambda)=H_{12,i}(\lambda)I(\lambda) \tag{1}$$

where I(λ) is the input signal I, expressed in the wavelength domain and $H_{12,i}(\lambda)$ is the already defined wavelength response of the reconfigurable device 103; the subscript "i" indicates the generic status assumed by the device itself, in relation to the transmission of the input signal I from input optical port 101 to output optical port 102.

To facilitate the understanding of the following mathematical notations, in FIG. 1 the numbers 1, 2, 3 and 4 have been added in brackets at the relevant optical ports of the reconfigurable device 103.

The control method starts when there is a request to reconfigure optical system 100 and in particular reconfigurable device 103.

As already mentioned, the described control method performs monitoring and control of the response in wavelength $H_{12,i}(\lambda)$ so that an i-th "effective" state, defined by an effective wavelength response $\tilde{H}_{12,i}(\lambda)$, assumed by the reconfigurable device 103 under operating conditions is as close as possible to an i-th "desired" state, defined by a response in $H_{12,i}(\lambda)$.

The optical stimulation signal $S_{in}$, generated by the optical source 106, is supplied at the input of stimulation port 111 of the reconfigurable device 103 in order to measure in real time the actual state $H_{i,e}(\lambda)$ and evaluate the deviation (i.e., the distance) with respect to the desired state $H_{i,d}(\lambda)$.

Note that the desired $H_{i,d}(\lambda)$ states are identified in advance and stored, for example in a lookup table, in a control device memory 110, but can also be updated and modified dynamically during operation of the reconfigurable device 103.

The reconfigurable device 103 receives the stimulation signal $S_{in}$ and returns the monitoring signal $S_{out}(\lambda)$ to the optical monitoring port 112; the optical monitoring signal $S_{out}(\lambda)$ is described in the following relation:

$$S_{out}(\lambda)=H_{34,i}(\lambda)S_{in}(\lambda) \tag{2}$$

The function $H_{34,i}(\lambda)$ identifies the transfer function of the reconfigurable device 103 from the stimulation port 111 to the monitoring optical port 112, when the device itself is in the i-th state to which the transfer function $H_{12,i}(\lambda)$, is associated, relative to the transmission from the input optical port 101 to the output optical port 102.

It should be noted that for the purposes of the following discussion the reconfigurable device 103 is considered as having the following properties, defined below according to the transfer functions between the optical ports of the device itself:

- reciprocity: $H_{mn,i}(\lambda)=H_{nm,i}(\lambda)$;
- absence of retroreflections on all optical ports (101, 102, 111, 112): $H_{11,i}(\lambda)=H_{22,i}(\lambda)=H_{33,i}(\lambda)=H_{44,i}(\lambda)=0$;
- no coupling between ports 1-4 ($H_{14,i}(\lambda)=H_{41,i}(\lambda)=0$) and between ports 2-3 ($H_{23,i}(\lambda)=H_{32,i}(\lambda)=0$);
- absence of leakage.

In the properties indicated above, the term "absence" is to be understood in the sense that the retroreflexsion, coupling or losses indicated above are null or negligible for the purposes of the following discussion.

As the expert in the field acknowledges, the above mentioned properties apply to the relationships:

$$|H_{12,i}(\lambda)|^2+|H_{13,i}(\lambda)|^2=1$$

$$|H_{31i}(\lambda)|^2+|H_{34,i}(\lambda)|^2=1$$

from which it can be seen that:

$$|H_{12,i}(\lambda)|^2=|H_{34,i}(\lambda)|^2 \tag{3}$$

The relation (3) shows how the optical monitoring signal $S_{out(\lambda)}$ monitoring, associated with the transfer function $|H_{34,i}(\lambda)|^2$, provides the same information as the direct monitoring of the optical output signal O (λ), associated with the transfer function $|H_{12,i}(\lambda)|^2$.

Given the reciprocity of the reconfigurable device 103, the transfer functions $|H_{34,i}(\lambda)|^2$e$|H_{43,i}(\lambda)|^2$ are theoretically identical and both could be monitored. However, in practical cases it is convenient to use a stimulation signal that propagates in the opposite direction (counterpropagant) to the signal of interest. In fact, in case of co-propagant signals, the reconfigurable device 103 could be responsible for crosstalk phenomena and transfer part of the input stimulation signal to port 4 towards port 2. Therefore, a counterpropagant configuration is preferable even if it is not the only one possible.

Since the spectrum of the Sin(λ) stimulation signal is known, the transfer function $H_{34,i}(\lambda)$ can be derived directly from monitoring signal the $S_{out}(\lambda)$ (at monitoring port 112) through the relationship (2).

Note also that system 100 operates on the basis of knowledge of the spectrum of the signal $S_{out}(\lambda)$ only for a K number of wavelengths, preferably equally spaced, and preferably equal to the number of degrees of freedom N of device 103 (K=N).

Note that the K number of the wavelengths at which the spectrum of the signal $S_{out}(\lambda)$ is considered can also be chosen to be greater than the number of degrees of freedom N: K>N. In this case, system 100 is particularly robust against noise, but is more complex than if K is equal to N.

On the other hand, by choosing the number K less than the number of degrees of freedom (K<N) the system 100 performs worse than K≥N.

The K number can be between a minimum Kmin and a maximum Kmax value. For example, the minimum value can be given by Kmin=N−20% N, or Kmin=N−5% N. For example, regarding the maximum value, Kmax=N+100% N, or Kmax=N+50% N, or Kmax=N+20% N.

With regard to the choice of the number K, please note that in the system 100 it is not required to be equal to the number of optical channels M, but can also be less or much less than the number of optical channels M (K<M). For example, when the reconfigurable device 103 is used in an amplification system with M=130 channels, the number of monitored wavelengths K may be less than 15%, i.e. K<15% M. Other possible example values are, K<50% M and K<30% M.

The number K is chosen, depending on the application, by appropriately combining both the above mentioned relations concerning the number of degrees of freedom N and the above mentioned relations concerning the number of optical channels M, considering a compromise between robustness and complexity.

Moreover, it should be noted that for the control method, it is sufficient to know only the intensity of the optical monitoring signal $|S_{out}(\lambda)|^2$ and not its phase at various wavelengths.

Therefore, the information that is used by the control device 110 is the intensity of the optical monitoring signal:

$$|S_{out}(\lambda_k)|^2 \tag{4}$$

where the subscript k=1.2, . . . K indicates the discrete frequency at which the spectral power density $|S_{out}(\lambda)|^2$ is sampled.

The spectral slicer 105 receives the monitoring optical signal $S_{out}(\lambda)$ and transmits to each relevant output port 109 a sampled optical signal $S_{out}(\lambda_k)$ corresponding to a portion of the monitoring optical signal $S_{out}(\lambda)$ centred around the k-th wavelength $\lambda_k$. In particular, the spectral slicer 105 provides on its output ports 109 a plurality of sampled optical signals $S_{S1}$-$S_{SK}$ in parallel mode.

Figure 2:
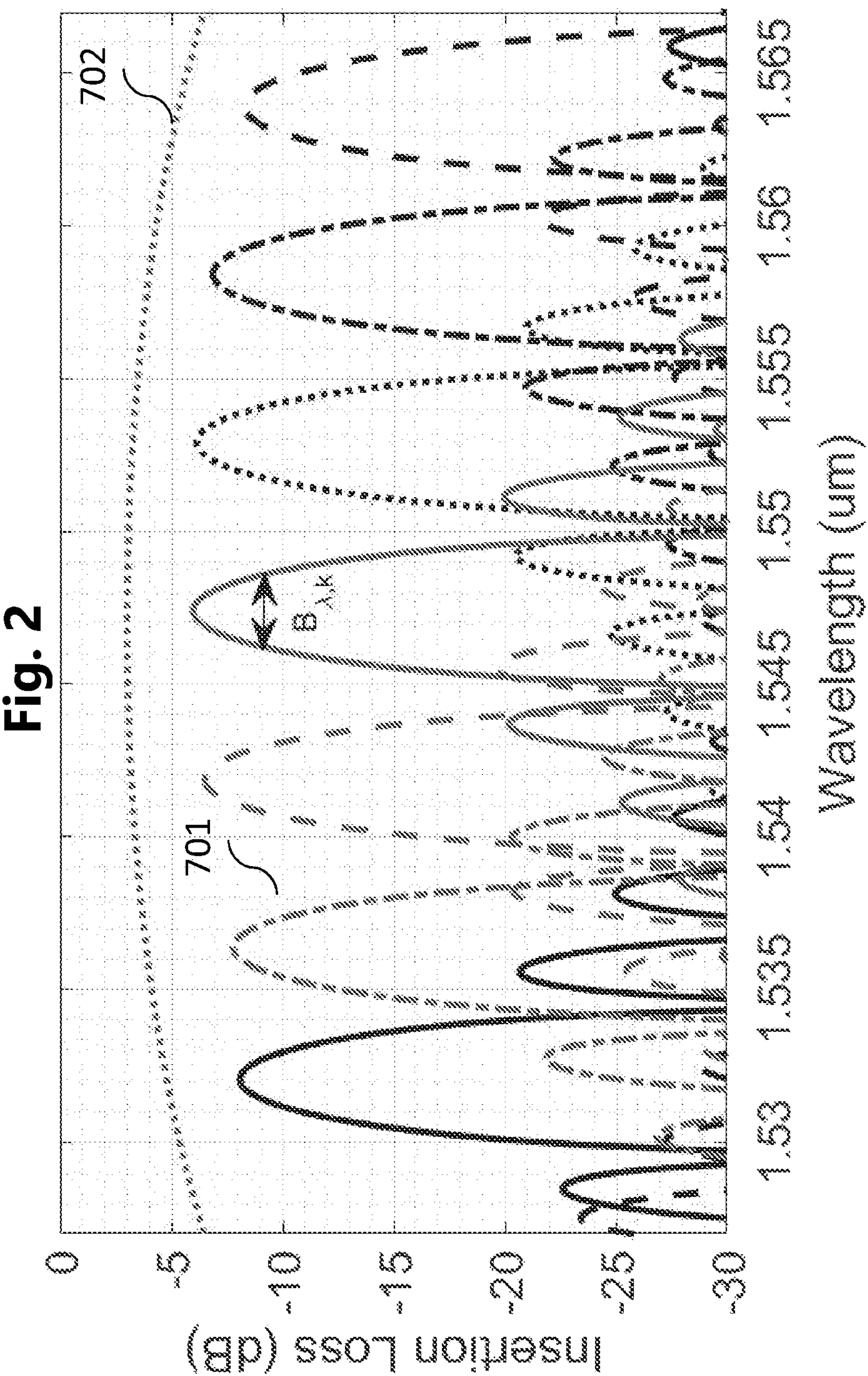
FIG. 2 refers to a numerical simulation of the optical system in FIG. 1 and shows the spectrum of a monitoring signal and a sampled version of it.

FIG. 2 refers to a numerical simulation and shows, for example, a spectrum 702 of the signal $S_{out}(\lambda)$ for a possible configuration of the reconfigurable device 103 and also the portioned version 701 of the same signal and its sub-bands $S_{out}(\lambda_k)$, each with its own band $B_{\lambda,k}$.

Each optical output 109 of the spectral slicer 105 is optically connected to a photo detector of the optical-electric converter 104 which measures the input optical intensity and provides on a related terminal 108 an electrical signal $S_{EL_j}$ having an electrical current or voltage proportional to the intensity $|S_{out}(\lambda_k)|^2$ of the optical monitoring signal $S_{out}(\lambda_k)$ integrated on its own sub-band $B_{\lambda,k}$. The optical-electric converter 104 generates N electrical signals $S_{EL1}$-$S_{ELN}$, in parallel on the plurality of terminals 108.

The plurality of electrical signals $S_{EL1}$-$S_{ELK}$ is sent to the control device 110 which monitors in real time the effective frequency response $|\tilde{H}_{32,i}(\lambda_k)|^2=|\tilde{H}_{12,i}(\lambda_k)|^2$ assumed by the reconfigurable device 103 under operating conditions at k-th wavelength $\lambda_k$ solving the equation:

$$|\tilde{H}_{34,i}(\lambda k)|^2=|S_{34,i}(\lambda_k)|^2/|S_{in}(\lambda_k)|^2.$$

Control device 110 compares the current state $\tilde{H}_{12,i}(\lambda)$ with the desired state $H_{12,i}(\lambda)$ and identifies the control signals $S_1$-$S_N$ to be applied, via control terminals 107, to the actuators $A_1$-$A_N$ of the reconfigurable device 103 to bring it and keep it in the desired state.

For example, the determination of the control signals $S_1$-$S_N$ can be carried out, on the basis of the current state $\tilde{H}_{12,i}(\lambda)$ and the desired state $H_{12,i}(\lambda)$, according to the method of minimising the mean square error; note however that other methods can also be used. An example of the method of minimizing the mean squared error is described later with reference to a simulation of the control method.

Please note that during an initialisation phase of the optical system 100, the values of the control signals $S_1$-$S_N$ to be applied can be taken from a look up table obtained from numerical simulations of the reconfigurable device 103.

Once these values are applied to the reconfigurable device 103, proceed to apply the method described above to bring it to the desired state indicated by the look up table.

Figure 3:
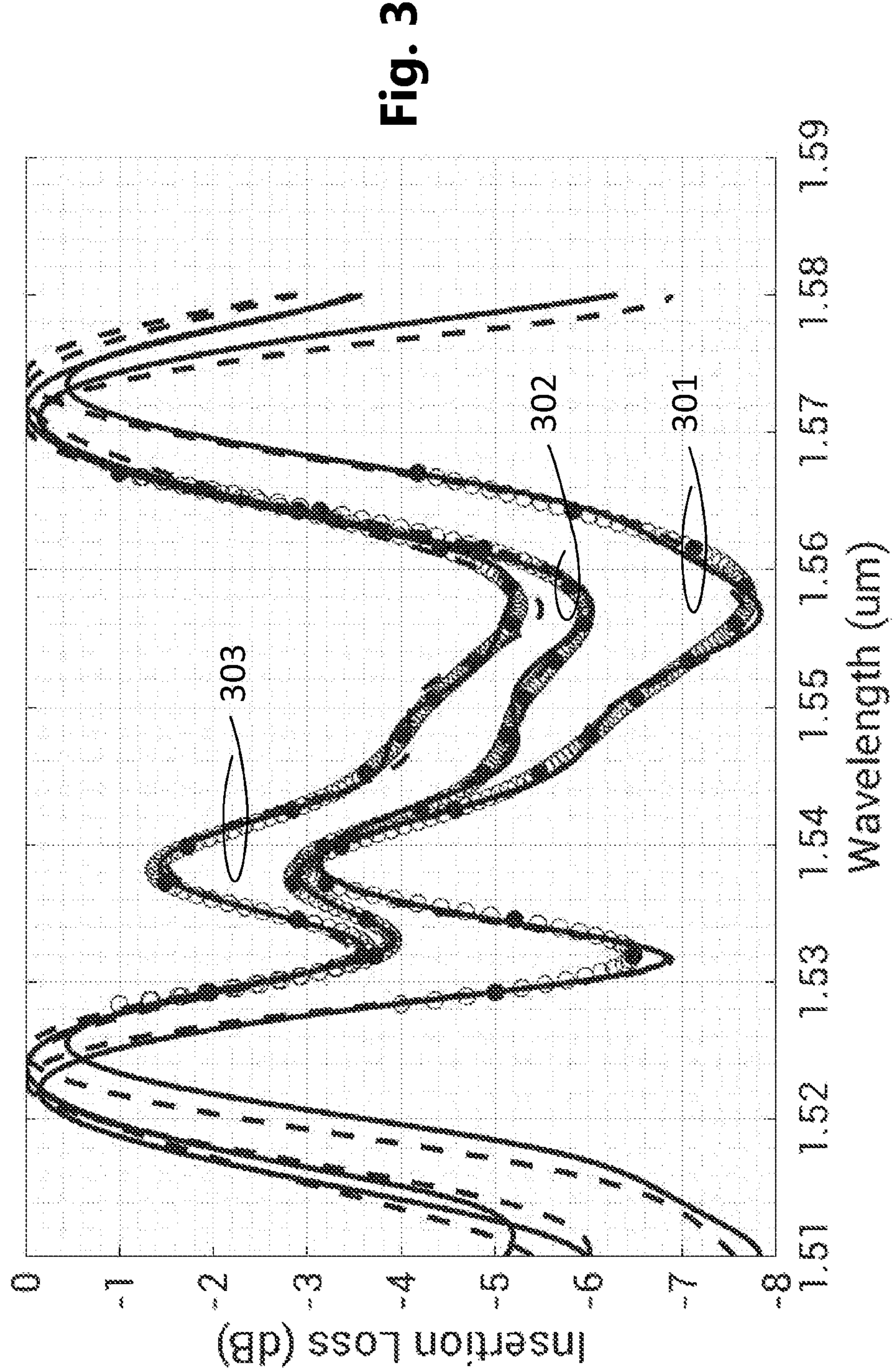
FIG. 3 refers to a numerical simulation of the optical system of FIG. 1 and shows the trend of transfer functions obtained with the prior art method and with the methodology of the described solution.

Simulation FIG. 3 refers to a numerical simulation showing the effectiveness of the optical system 100. Consider a generic reconfigurable device 103 having degrees of freedom N=15. In the simulation, a reconfiguration of device 103 has been considered so that its frequency response, in the wavelength range between 1528 nm and 1568 nm, can assume three predefined trends (301, 302, 303). Starting from an arbitrary initial configuration and wanting to bring the reconfigurable device 103 to work in the i-th state (301, 302 or 303), the mean square error is calculated:

$$\Sigma_{k=1}^{K}=[|\tilde{H}_{12,i}(\lambda)|^2-|H_{12,i}(\lambda_k)|^2] \tag{5}$$

between the current transfer function $\tilde{H}_{12,i}(\lambda)$ and the desired transfer function $H_{12,i}(\lambda)$ for the generic state i. For the optimization of the transfer function of the reconfigurable device 103 alternative cost functions to those expressed by the equation (5) can be used, as well as other optimization algorithms, such as non-linear optimization, genetic algorithms, particle swarm optimization, machine learning, neural networks and others known in the literature.

In this simulation we first applied the method of the known technique, according to which the transfer functions $|H_{12,i}(\lambda_k)|^2$ in the three different states (301, 302 and 303) measured in a high number of wavelengths (open circles), equal to the number of optical channels used in the wavelength range of interest (K=M=130), were taken into account. By applying this conventional method, the curves shown in FIG. 3 with dashed lines have been obtained.

Applying instead the control methodology described with reference to the optical system 100, the transfer functions $|H_{12,i}(\lambda_k)|^2$ are measured in a limited number of wavelengths (K=N=15) equal to the number of degrees of freedom of the reconfigurable device 103 (full circles). Applying the method described with reference to system 100 we obtained the curves shown in FIG. 3 with the continuous lines.

FIG. 3 illustrates how the difference between dashed curves (conventional method) and continuous curves (system 100 method) is smaller than 0.2 dB across the entire operation band, confirming the efficiency of the method described.

Figure 4:
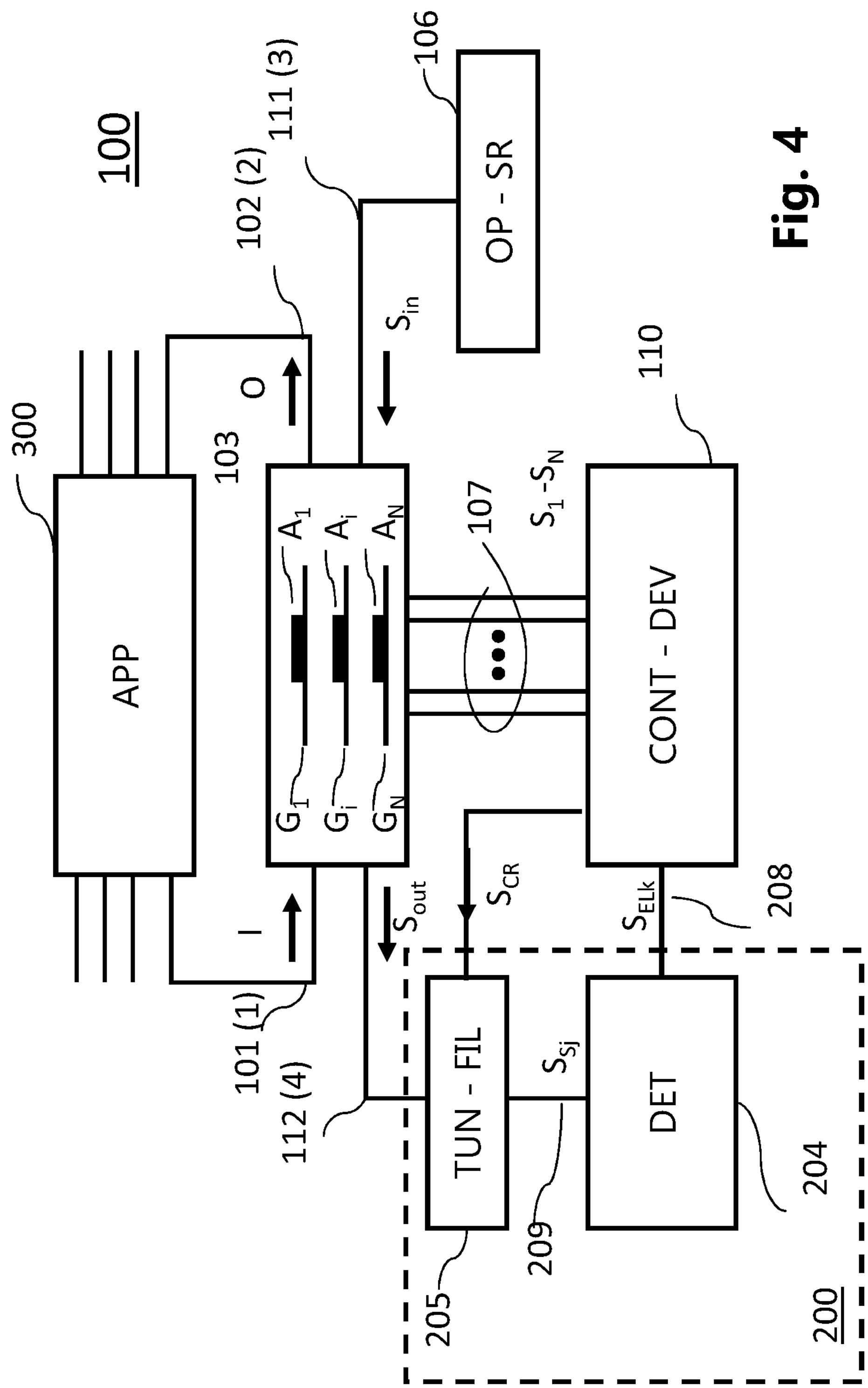
FIG. 4 shows a second embodiment of the optical system of FIG. 1.

According to another form of realization of the optical system 100, schematically shown in FIG. 4, the optical-electrical conversion device 200 is realized by means of a tunable monitor configured to supply the control device 110 with the set of electrical signals of intensity $S_{EL1}$-$S_{ELN}$ in a sequential way over time (i.e. in serial mode), starting from the optical monitoring signal $S_{out}$. This tunable detector 200 includes, according to an example, a tunable optical filter 205 (TUN-FIL) with a single optical output 209 followed by a photodetector 204 (DET) with a single electrical output 208. The tunable detector 200 is an active device that receives an external active control (an $S_{CR}$ control signal) to select $\lambda_k$ wavelengths.

Optical output 209 of the tunable optical filter 205 is optically connected to the photodetector 204 which measures the input optical intensity and provides an electrical signal $S_{ELk}$ with a current or voltage proportional to the intensity $|S_{out}(\lambda_k)|^2$.

By sequentially tuning the tunable detector 200 over time it is possible to obtain information on the current transfer function $\tilde{H}_{12,i}(\lambda)$ of the reconfigurable device 10, around all the frequencies of interest.

The electrical $S_{EL1}$-$S_{ELK}$ signals output sequentially from the 204 photodetector are sent to control device 110 and provide monitoring of the actual frequency response $\tilde{H}_{12,i}(\lambda)$ of the reconfigurable device 103, under operating conditions.

Possible architectures that can be used for the tunable optical filter 205 include: optical ring resonators, Mach Zehnder interferometers, Bragg gratings, and possible combinations of these.

The tunable detector 200 is preferably realized in waveguide and is preferably integrated on the same photonic platform as the reconfigurable optical device 103, already described, or it can be realized with discrete optical components in free space, optical fibre components and combinations of the same.

For example, for tuning the tunable optical filter 205, the electrical control signal $S_{CR}$ (generated by the control device 110) can be used, which acts on actuators (not shown) integrated in the tunable optical filter 205. These actuators modify the behaviour of the tunable filter 205 by modifying the optical parameters of the material medium in which the light radiation propagates exploiting, for example, the thermo-optical effect, the electro-optical effect, or the elasto-optical effect; alternatively, micromechanical actuators (MEMS) can be used which modify the path of the light radiation in the device.

Figure 5:
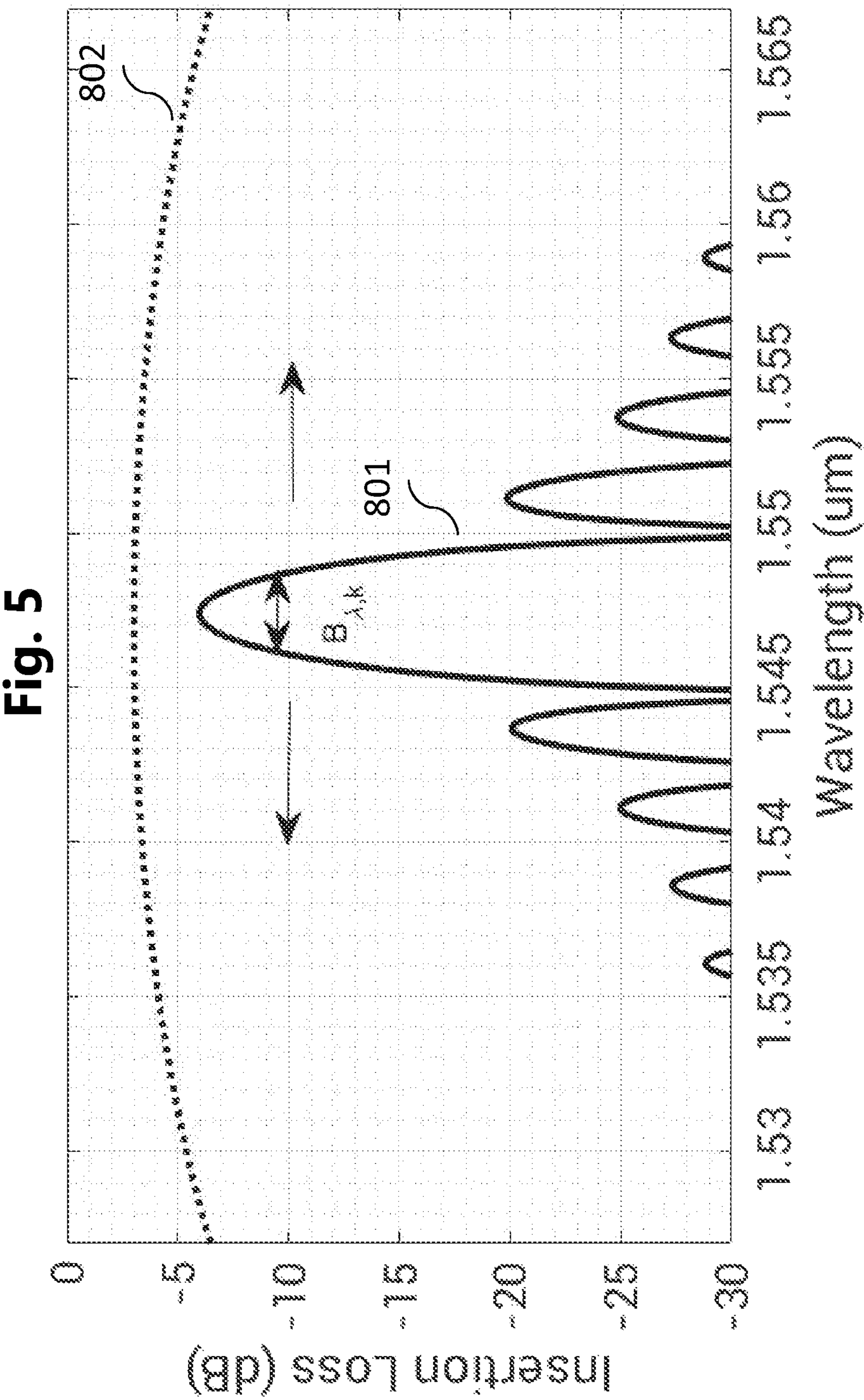
FIG. 5 refers to a numerical simulation of the optical system of FIG. 4.

FIG. 5 refers to a numerical simulation of an optical system 100 similar to that described in FIG. 4, including the tunable optical filter 205.

The curve 802 in FIG. 5 shows the spectrum of the optical monitoring signal $S_{out}(\lambda)$ for a particular configuration of the reconfigurable optical device 103. FIG. 5 also shows (curve 801) the "sampled" version of the optical monitoring signal and its sub-band, with its band $B_{\lambda,k}$ as obtained through the tunable filter 205, capable of tuning across the entire operation band.

Figure 6:
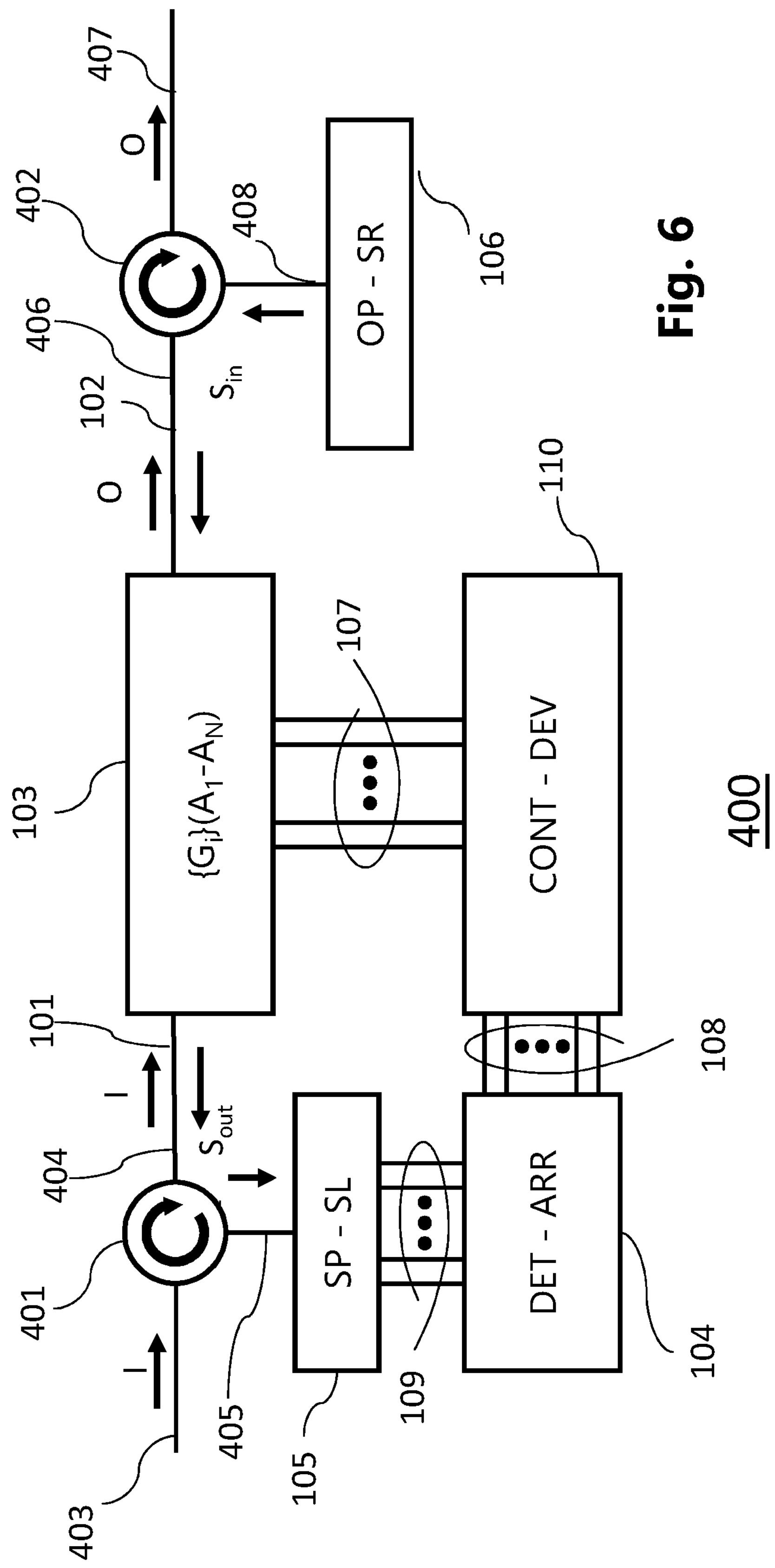
FIG. 6 refers to a third embodiment of the optical system of FIG. 1.

FIG. 6 schematically shows a further optical system 400, similar to optical system 100 already described with reference to FIG. 1, but using a reconfigurable optical device 103 with two ports (input optical port 101 and output optical port 102).

The further optical system 400 comprises a first circulator 401 and a second optical circulator 402. The first optical circulator 401 is equipped with a first port 403 for the input signal I and a second port 404, connected to the optical input port 101 of the reconfigurable device 103 to which the input signal I can be supplied. The optical input port 101 of the reconfigurable device 103 is also such as to feed the second port 404 of the first optical circulator 401 with the monitoring optical signal $S_{out}$. The first 401 circulator is equipped with a third port 405 connected to the spectral slicer 105 to supply the latter with the optical monitoring signal $S_{out}$.

The second optical circulator 402 includes a relative first port 406 connected to output port 102 of the reconfigurable device 103. The optical output port 102 is such as to supply the output signal O to the second optical circulator 406 and is also such as to receive the stimulation signal $S_{in}$.

The second optical circulator 402 is also equipped with a relative second port 407, configured to supply the output signal O, and a relative third port 408, configured to receive the stimulation signal $S_{in}$ generated by the optical source 106 and to be transmitted to the corresponding first port 406, then to the reconfigurable device 103 (via output port 102).

If the case that the reconfigurable two-port optical device 103 is reciprocal, the transfer function $H_{21}$ is equal to the transfer function $H_{12}$.

It should be noted that the structure that has the reconfigurable two-port optical device 103, equipped with the two optical circulators 401 and 402, is also applicable to the form of construction in FIG. 4.

Figure 7:
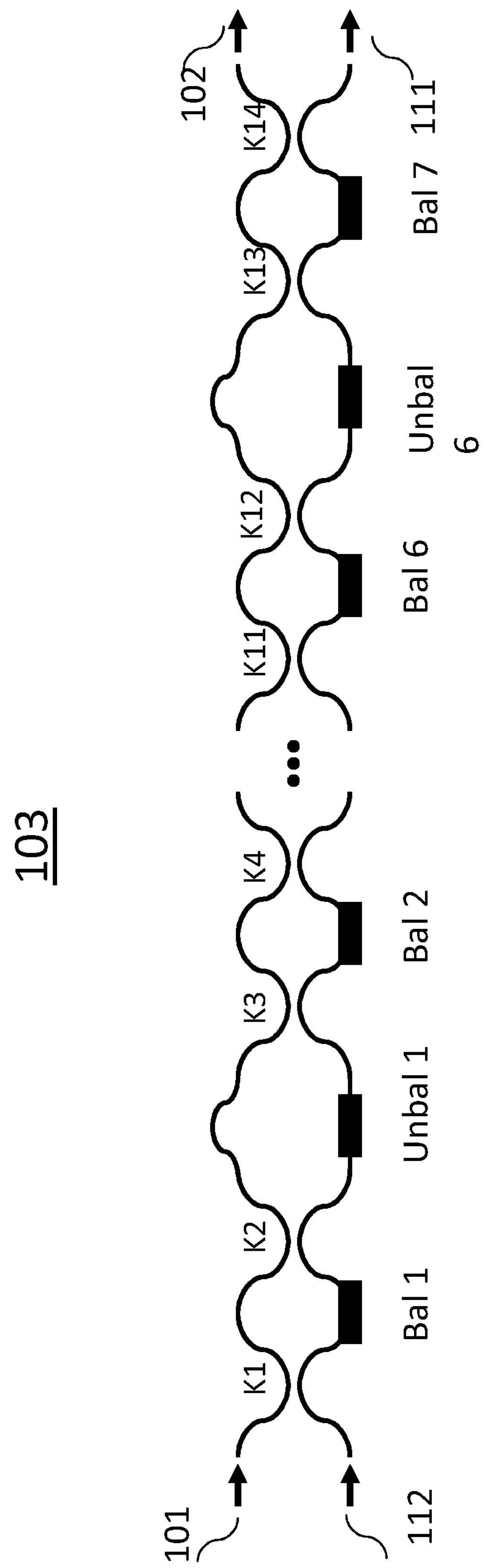
FIG. 7 shows an example of a reconfigurable device that can be used in that optical system.

FIG. 7 is a schematic representation of an optical lattice filter 203, indicative of an example of a reconfigurable device 103.

The optical lattice filter 103 comprises a plurality of optical couplers K1-K14 and a plurality of actuators Bal 1, 2 . . . 7 and Unbal 1, 2, . . . 6, suitable for introducing delays or imbalances in the optical channels, for a total of thirteen actuators.

The lettice filter 103 in FIG. 7 has a number of degrees of freedom N equal to 13, i.e. equal to the number of actuators used, and can handle up to a number M of optical channels equal to 96. It is possible to manage the reconfigurability of the lattice filter 103 by monitoring only a K number of wavelengths equal to N=13.

The optical couplers K1-K14 are an example of the optical elements Gi described with reference to FIG. 1 and the plurality of actuators Bal 1, 2 . . . 7 and Unbal 1, 2, . . . 6 are an example of the $A_1$-$A_N$ actuators described with reference to FIG. 1.

Note that each of the actuators Bal 1, 2 . . . 7 and Unbal 1, 2, . . . 6 acts on the optical behaviour of a corresponding Kj optical coupler which operates in WDM mode, i.e. it allows the propagation of several optical channels.

In general, the reconfigurable device 103 can be an optical filter that includes as optical elements Gi: binary tree or lattice interferometers, AWG (Arrayed Waveguide Gratings) or similar structures that use as power dividers, for example, MultiMode Interferometers (MMI), directional couplers, or y-branches or similar.

Please note that the solution described above is mainly, but not exclusively, applied in the telecommunications industry, specifically in the field of reconfigurable optical networks. Examples of other possible applications of the lessons described are:

1) optical devices for both fibre and waveguide sensors, which require the stabilisation of optical circuits to process sensor readings, 2) optical devices for distance measurements such as LIDARs, which require a very wide operating temperature range and can take advantage of the stabilization obtained with the invention, 3) optical circuits for 5G wireless networks, which can exploit photonic circuits to improve the performance of mobile network coverage using, for example, beamforming networks with integrated photonic circuits controlled by the method described in the invention.

4) reconfigurable optical circuits that can introduce an adjustable delay time, used for example in optical interferometry, optical tomography and other applications where it is necessary to synchronise relative delays between two or more optical signals;

The optical systems described above are particularly advantageous in terms of simplicity and performance. In fact, these optical systems allow managing their reconfiguration by monitoring a number of signals (i.e. sampled optical signals $S_{S1}$-$S_{SK}$) lower than the number of optical channels on which the system itself operates, maintaining the desired performance.

Moreover, the described optical systems have the advantages offered by closed circuit control without requiring a high complexity of the actuator system controlled by the control device.

The lower number of signals to be monitored implies a reduction in the costs related to the necessary components, the physical dimensions of the control system and facilitates packaging operations.

The invention claimed is:

1. Optical system comprising:

a reconfigurable wavelength division multiplexing optical device comprising a plurality of actuators and having an associated number M of optical channels M and a number N of degrees of freedom defined by the number of said actuators and less than said number M of optical channels;

a stimulating optical source connected to said reconfigurable optical device to provide a stimulation optical signal having a wavelength band including a plurality of wavelengths associated to the optical channels;

an optical-electric conversion device configured to receive from said reconfigurable optical device an optical monitoring signal produced in response to the stimulation optical signal and to provide a group of intensity electric signals, each representative of an intensity of the monitoring optical signal evaluated at a respective wavelength included in said band;

a control device configured to control the plurality of actuators as a function of said group of electric signals and according to a control law, wherein: the group of intensity electric signals has a cardinality K selected on the basis of said number of degrees of freedom N and comprised between a first minimum value K1min=N−20% N and a first maximum value K1max=N+100% N.

2. System according to claim 1, wherein:

the cardinality K is comprised between a second minimum value K2 min=N−5% N and a second maximum value K2max=N+50% N;

or the cardinality K is comprised between said second minimum value K2 min and a third maximum value K3max=N+20% N.

3. System according to claim 1, wherein the cardinality K is equal to the number of degrees of freedom N.

4. System according to claim 1, wherein the control device is configured to:

evaluate by the group of intensity electric signals and stimulation optical signal an effective transfer function of the reconfigurable optical device;

compare the effective transfer function of the reconfigurable optical device with a desired transfer function;

generate a plurality of control signals of the plurality of actuators for causing the reconfigurable device to have the desired transfer function.

5. System according to claim 4, wherein the control device is configured to define the plurality of control signals by using one of the following methods applied to the effective transfer function and desired transfer function: method of minimizing the mean square error; non-linear optimization, genetic algorithm, particle swarm optimization, machine learning, neural network.

6. System according to claim 1, wherein the reconfigurable device comprises:

an operative input for an input optical signal, an operative output for an output optical signal corresponding to the input optical signal;

a stimulation input for receiving said stimulation signal;

a monitoring output for providing the monitoring optical signal to the optical-electric conversion device.

7. System according to claim 1, wherein the optical-electric conversion device comprises:

a spectral slicer comprising a plurality of output optical ports and configured to receive the monitoring optical signal ($S_{out}$) and to deliver to said plurality of output optical ports a plurality of sampled optical signals each corresponding to said portion of the monitoring optical signal;

an optical-electric converter connected to the plurality of output optical ports for receiving the plurality of sampled optical signals and comprising a plurality of electric terminals configured to transmit the plurality of intensity electric signals to the control device.

8. System according to claim 1, wherein the optical-electric conversion device comprises:

a tunable filter configured to receive the monitoring optical signal and to deliver, by a serial transmission to an output optical port, the plurality of sampled optical signals each corresponding to said portion of the monitoring optical signal;

an optical detector connected to the output optical port for receiving the plurality of sampled optical signals and comprising an electric terminal configured to transmit, by a serial transmission, the plurality of the intensity electric signals to the control device.

9. System according to claim 1, wherein the reconfigurable device is a two ports device comprising an operative input for an input optical signal and an operative output for an output optical signal; further the system comprising:

a first optical circulator having: a first optical port for receiving the input optical signal from the outside, a second optical port connected to the operative input for delivering to the reconfigurable device the input optical signal and for receiving the monitoring optical signal from the reconfigurable device; a third optical port for delivering the monitoring optical signal to the optical-electric conversion device;

a second optical circulator having: a respective first optical port connected to the operative output, a respective second optical port for providing to the outside the output optical signal; a respective third optical port for receiving the stimulation optical signal and for transmitting it to the reconfigurable optical device by said operative output.

10. System according to claim 1, wherein the reconfigurable device is a device belonging to the group of: an optical filter, an equalizing filter, a dispersion compensating filter, a FIR filter, an IIR filter, a lattice filter, a binary tree filter.

11. System according to claim 10, wherein the reconfigurable device comprises at least one of the following optical components: a binary tree interferometer, a lattice interferometer, AWG (Arrayed Waveguide Gratings), a power divider, a multimode interferometer, directional couplers, y-branch.

12. Optical system according to claim 1, wherein the plurality of actuators comprises at least one of the following actuators: thermo-optical actuator, electro-optical actuator, piezoelectric actuator, electro-absorptive actuator, electromechanical actuator, electro-chemical actuator, a completely optical actuator based on linear optical effects, a completely optical actuator based on non-linear optical effects.

13. Optical system according to claim 1, wherein at least the reconfigurable device and optical-electric conversion device are made by integrated optics techniques.

14. Optical system according to claim 1, wherein the reconfigurable device comprises a plurality of optical elements adjustable by said plurality of actuators, each optical element is configured to operate according to the wavelength multiplexing technique.

15. Optical system according to claim 1, wherein said stimulation optical source is selected in the group comprising: a super luminescent diode (SLD), a ASE noise of a fiber amplifier, a ASE noise of a semiconductor optical amplifier, a "supercontinuum laser" type source, a laser array, a distributed feedback laser DFB, a fiber comb generator, an integrated comb generator on an optical chip.

16. Method of reconfiguring an optical device, comprising:

providing a wavelength division multiplexing reconfigurable optical device, comprising a plurality of actuators and having an associated number M of optical channels and a number N of degrees of freedom N defined by the number of said actuators;

delivering to said reconfigurable optical device a stimulation optical signal having a wavelength band including a plurality of wavelengths associated to the optical channels;

receiving from said reconfigurable optical device a monitoring optical signal produced in response to the stimulation optical signal and performing an optical-electric conversion by providing a group of intensity electrical signals each representative of an intensity of the monitoring optical signal evaluated at a respective wavelength included in said band;

controlling the plurality of actuators as a function of said group of electric signals and according to a control law;

wherein:

the group of intensity electric signals has a cardinality K selected on the basis of said number of degrees of freedom N and comprised between a first minimum value K1min=N −20% N and a first maximum value K1max=N+100% N.

* * * * *